UNITED STATES PATENT OFFICE.

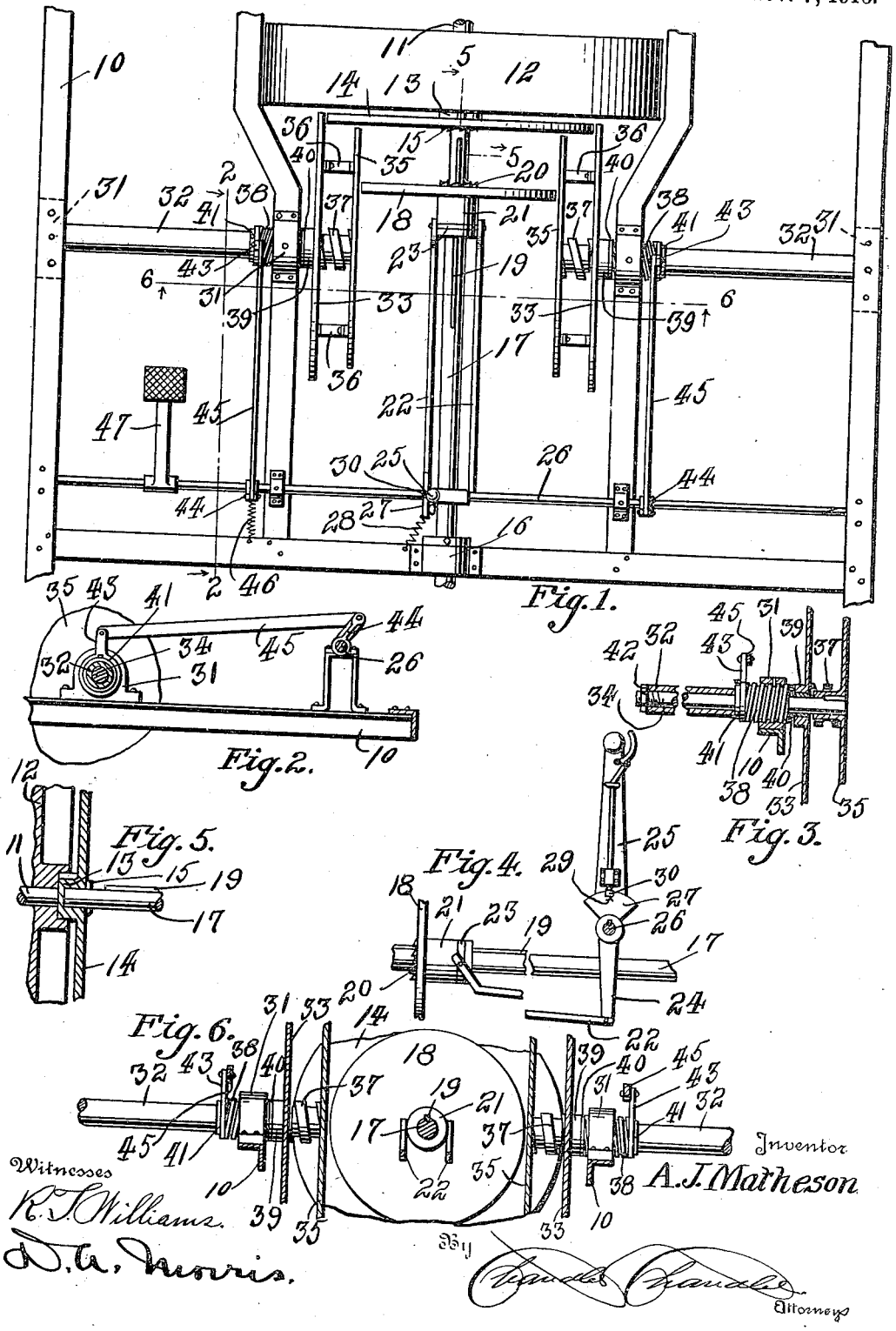

ARCHIBALD J. MATHESON, OF VIRGELLE, MONTANA.

TRANSMISSION-GEARING.

1,203,892.　　　　　Specification of Letters Patent.　　Patented Nov. 7, 1916.

Application filed May 8, 1915. Serial No. 26,729.

*To all whom it may concern:*

Be it known that I, ARCHIBALD J. MATHESON, a citizen of the United States, residing at Virgelle, in the county of Chouteau, State of Montana, have invented certain new and useful Improvements in Transmission-Gearings; and I do hereby declare the following to be a full, clear, and exact description of the invention, such as will enable others skilled in the art to which it appertains to make and use the same.

This invention relates to transmission gearing and has especial reference to an improved form of transmission gearing adapted for use in connection with an automobile or the like and is in the nature of an improvement of the device disclosed in my application #841,587, filed May 28, 1914.

An object of the invention resides in the provision of a device by means of which a direct positive drive may be obtained from the engine shaft as well as a frictional drive.

A further object of the invention resides in so constructing the device that when the frictional drive is used various speeds ahead or to the rear may be obtained.

A further object of the invention resides in so constructing the device that it may be controlled by either a hand or foot lever.

With these and other objects in view, such as will appear as the description progresses, my invention comprises the combination and arrangement of parts as set forth in and falling within the scope of the appended claims.

Referring to the drawings:—Figure 1 is a plan view of a device constructed in accordance with my invention. Fig. 2 is a vertical sectional view on line 2—2 of Fig. 1. Fig. 3 is a fragmental detail showing the manner of mounting the friction disks. Fig. 4 is a fragmental detail, showing the means for shifting the disk on which one portion of the clutch is formed. Fig. 5 is a vertical sectional view on line 5—5 of Fig. 1. Fig. 6 is a section on line 6—6 of Fig. 1.

Referring to the drawing wherein like parts are indicated by like characters throughout the several views: In the embodiment of my invention illustrated in the drawing, I have illustrated a portion of an automobile frame 10 on which is mounted a suitable engine (not shown) from which extends a crank shaft 11 on which is mounted a fly wheel 12. Mounted on this fly wheel and held in spaced relation by a hub 13 is a friction wheel 14 having clutch teeth 15 on the face opposite to that from which the hub 13 extends. Rotatably mounted in the hub 13 and in a bearing 16 on the frame 10 is a shaft 17 on which is slidably mounted a friction wheel 18 of lesser diameter than the wheel 14, which wheel 18 is provided with a slot through which a key 19 on the shaft 17 extends so that the wheel will rotate with the shaft. This friction wheel 18 is provided with clutch teeth 20 which are arranged to coöperate with the clutch teeth 15 on the wheel 14. This shaft 17 is operatively connected to the driving gears (not shown).

In order that the wheel 18 may be shifted so that the clutch 20 thereon will engage the clutch teeth 15 on the wheel 14, I have provided the wheel 18 with a sleeve 21 with which is connected a pair of shipper levers 22 by means of a collar 23. These shipper levers extend rearwardly and are pivotally connected to the projections 24 on a controlling lever 25. This controlling lever 25 is pivotally mounted on a transversely extending shaft 26 which is rotatably mounted in the frame 10. Secured to this shaft 26 is a quadrant plate 27 which has a spring 28 secured thereto, which is also secured to the frame 10. This plate 27 is provided with a notch 29 which coöperates with a pawl 30 on the lever 25 to secure the lever to the shaft 26, rigidly.

In order that the shaft 17 may be driven by a frictional clutch, I have provided the following mechanism. Inasmuch as the parts on both sides of the shaft 17 are identical I will merely describe the construction and operation of the parts on one side for the sake of brevity. Mounted in bearings 31 on the frame 10 is a hollow shaft 32 which has a friction disk 33 mounted on the end thereof, which disk is adapted to engage the periphery of the friction wheel 14. Extending through this hollow shaft 32 is a shaft 34 which has a friction disk 35 mounted on the end thereof in spaced relation to the disk 33. This disk 35 is adapted to engage the periphery of the wheel 18. The disks 33 and 35 are secured together by links 36 and the disk 35 is normally pushed away from the disk 33 by a coil spring 37. The inner bearing 31 is internally threaded and engaged with these internal threads is a sleeve 38 which bears against the inner face of the hub 39 on the disk 33, but between which sleeve and hub a thrust ball-bearing 40 is provided. This sleeve is held in place upon the shaft 32 by a collar 41. Thus when the sleeve is rotated in one direction the disks 33 and 35 will be engaged, respectively, with the wheels 14 and 18. On the outer end of the shaft 34 is a nut 42 by means of which the said shaft 34 may be adjusted with relation to the containing shaft 32 so as to change the tension on the spring 37.

In order that the sleeve 38 may be rotated, I have secured to the same an adjustable arm 43 which is connected to a crank 44 on the shaft 26 by means of a link 45. Thus when the shaft 26 is oscillated the disks 33 and 35 on each side of the shaft 19 will be simultaneously moved. These disks 33 and 35 are normally held out of engagement with the wheels 14 and 18 by a coil spring 46 which is connected to one of the cranks 44 and to the frame 10. Secured to this shaft 26 is a pedal 47 by means of which the disks 33 and 35 may be fed into engagement with the wheels 14 and 18.

Now when it is desired to drive the machine directly the controlling lever 25 may be pushed forwardly until the clutch teeth 20 engage the clutch teeth 15 on the wheel 14. At this time the pawl 30 will be free from the plate 27. Now should it be desired to drive the machine by means of the friction disks 33 and 35 the pawl 30 may be engaged with the plate 27. Then as the pedal 47 or the controlling lever 25 is pushed forwardly the friction disks 33 and 35 will be moved into engagement with the respective wheels 14 and 18 by the inward movement of the sleeves 38. The pedal 47 may of course be operated to merely disengage the clutch teeth 20 from the teeth 15 without applying the friction disks 33 or 35, the application of the disks depending upon the degree of movement of the pedal.

It is of course to be understood that the rotation of the wheel 14 will transmit the motion through the disk 33 to the disk 35 and thence through this disk to the wheel 18 and the shaft 17. The speed of the shaft 17 depends upon the position of the wheel 18 with relation to the center of the disk 35 and the direction of motion of the shaft will depend upon whether the plate 18 is forwardly or rearwardly of the said center.

From the foregoing description it will be seen that I have provided a device which greatly increases the tractive power of a friction drive and I have so constructed the device that the driven shaft may be actuated by either a direct and positive drive or a friction drive.

While I have illustrated and described a particular embodiment of my invention, I have merely done so for the sake of convenience and I do not wish to be limited to that particular embodiment as it is obvious that numerous changes may be made within the details of construction thereof without in any way departing from the spirit of the invention or exceeding the scope of the appended claims.

What I claim is:—

1. In a transmission gearing, the combination with a pair of friction wheels, of a hollow shaft, a friction disk secured thereto, a shaft extending through said hollow shaft, a relatively smaller friction disk secured thereto, a coil spring for moving said disks apart, links for limiting said movement, a bearing for said hollow shaft having threads therein, a threaded sleeve mounted in said bearing and arranged to bear against the first-mentioned friction disk and means for turning said sleeve to move the disks into and out of engagement with the said wheels.

2. In a transmission gearing, the combination with a pair of friction wheels, of a hollow shaft, a friction disk secured thereto, a shaft extending through said hollow shaft, a relatively smaller friction disk secured thereto, a coil spring for moving said disks apart, links for limiting said movement, a bearing for said hollow shaft having threads therein, a threaded sleeve mounted in said bearing and arranged to bear against the first-mentioned friction disk and a rock arm on said sleeve, a link connected at one end to said rock arm and an operating lever fulcrumed in spaced relation to the sleeve and having the remaining end of the link connected thereto.

In testimony whereof, I affix my signature, in the presence of two witnesses.

ARCHIBALD J. MATHESON.

Witnesses:
  F. S. MILLER,
  J. E. McCOY.

Copies of this patent may be obtained for five cents each, by addressing the "Commissioner of Patents, Washington, D. C."